(12) United States Patent
Ikegawa

(10) Patent No.: US 7,881,143 B2
(45) Date of Patent: Feb. 1, 2011

(54) INTERFACE CIRCUIT

(75) Inventor: Yoshiharu Ikegawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 11/959,171

(22) Filed: Dec. 18, 2007

(65) Prior Publication Data

US 2008/0211303 A1  Sep. 4, 2008

(30) Foreign Application Priority Data

Dec. 22, 2006  (JP) .............................. 2006-346261

(51) Int. Cl.
*G11C 5/14* (2006.01)
(52) U.S. Cl. ...................... 365/226; 365/227
(58) Field of Classification Search ................. 365/226, 365/227
See application file for complete search history.

(56) References Cited

U.S. PATENT DOCUMENTS 6,052,325 A * 4/2000 Merritt ........................ 365/226
6,433,609 B1 * 8/2002 Voldman ..................... 327/313
6,493,282 B2 * 12/2002 Iida et al. .................... 365/226
7,016,249 B2 * 3/2006 Ross .......................... 365/226

FOREIGN PATENT DOCUMENTS

JP  2002-007309 A  1/2002

* cited by examiner

*Primary Examiner*—Richard Elms
*Assistant Examiner*—Hien N Nguyen
(74) *Attorney, Agent, or Firm*—Canon USA, Inc. IP Division

(57) ABSTRACT

An interface circuit between a first device capable of being supplied with a first power and a second device capable of being supplied with a second power independent of the first power includes a first reference voltage generation unit configured to generate a first reference voltage from the first power, a second reference voltage generation unit configured to generate a second reference voltage from the second power, and a switching unit configured to switch to input respective different ones of the first and the second reference voltages to the first and the second devices. In this configuration, the memory controller can be separately powered off while electric power is being supplied to the memory which is connected to the memory controller via a bus.

6 Claims, 6 Drawing Sheets

INTERFACE CIRCUIT

BACKGROUND OF THE INVENTION

1. Field of the Invention

The present invention relates to an interface circuit using a reference voltage.

2. Description of the Related Art

A conventional stub series terminated logic (SSTL) interface circuit for interfacing between a memory controller and a memory can be configured as illustrated in FIG. 1.

In the SSTL interface circuit illustrated in FIG. 1, a memory 101 is controlled by a memory controller 102. Both the memory 101 and the memory controller 102 are connected to a reference voltage generation circuit 103. The same power VDDQ and reference voltage VREF are input to the memory 101 and the memory controller 102. In this configuration, the memory controller 102 cannot be separately powered off while electric power is being supplied to the memory 101. VTT represents termination voltage. Accordingly, when the memory 101 is backed up, the memory controller 102 wastes supplied electric power.

As a method for solving this problem, there is a configuration as illustrated in FIG. 2, in which two separate powers VDDQ1 and VDDQ2 are supplied to a memory 201 and a memory controller 202, respectively, and reference voltage generation circuits 203 and 204 are coupled to the memory 201 and the memory controller 202, respectively. This configuration enables the memory 201 to be backed up by turning off the power VDDQ2 and VTT to the memory controller 202 while supplying the power VDDQ1 to the memory 201.

Further, Japanese Patent Application Laid-Open No. 2002-7309 discusses an SSTL interface circuit in which two separate power supplies are respectively provided for a memory and a memory controller, and a channel line that connects the memory and the memory controller responds to a termination voltage, which is independent of power supply voltages to the memory and the memory controller.

However, in the above-described conventional example, separate powers are respectively supplied to the memory 201 and the memory controller 202. This causes a difference in power supply voltage, thus causing a difference in output voltage between the reference voltage generation circuits 203 and 204.

The SSTL interface circuit can reduce the amplitude of a signal to increase a transfer rate. For example, a reference voltage for use in a double-data-rate synchronous dynamic random access memory (DDR SDRAM) interface circuit requires an accuracy of ±2%. Accordingly, when the DDR SDRAM interface circuit receives two separate powers, it is necessary to decrease a difference in power supply voltage to within ±2%. If the DDR SDRAM interface circuit does not satisfy the accuracy of the reference voltage, the timing margin of setup hold time of a signal line is reduced. Accordingly, even if the DDR SDRAM interface circuit can receive two separate powers, it is difficult to increase the transfer rate of the DDR SDRAM interface circuit.

Further, as illustrated in FIG. 3, a common power VDDQ1 can be used to activate a memory 301 and a memory controller 302, and a power disconnect circuit 306 can turn off power to the memory controller 302. Reference voltage generation circuits 303 and 304 function similar to voltage generation circuits 203 and 204 from FIG. 2. This configuration can improve the accuracy of a reference voltage to some extent as compared with the configuration in FIG. 2. However, the power disconnect circuit 306 is generally configured with a field-effect transistor (FET). Since such a power disconnect circuit 306 generates an on-resistance, an input and output voltage drops by an amount of "on-resistance"דelectric current consumption". If the electric current consumption is large, the accuracy of a reference voltage is not satisfied. Further, in order to reduce the on-resistance, a plurality of FETs are required, thus resulting in high production cost.

As another method, if an SSTL interface circuit increases the output electric current capacity of an output buffer, the timing margin can be improved. However, if the SSTL interface circuit increases the output electric current capacity of the output buffer, a capacitor needs to be strengthened and the number of powers and grounding (GND) pins for a memory controller needs to be increased to stabilize a power supply circuit. This configuration may result in increasing cost. Further, the timing margin can be improved only to an extent that it is still reduced compared to when the accuracy of a reference voltage is satisfied.

SUMMARY OF THE INVENTION

The present invention is directed to an interface circuit capable of discontinuing supply of a voltage to a part of a plurality of devices without decreasing the accuracy of a reference voltage.

According to an aspect of the present invention, an interface circuit between a first device capable of being supplied with a first power and a second device capable of being supplied with a second power independent of the first power includes a first reference voltage generation unit configured to generate a first reference voltage from the first power, a second reference voltage generation unit configured to generate a second reference voltage from the second power, and a switching unit configured to switch to input respective different ones of the first and the second reference voltages to the first and the second devices.

According to another aspect of the present invention, an interface circuit between a first device capable of being supplied with one of a first or a second power and a second device capable of being supplied with only the first power includes a first reference voltage generation unit configured to generate a first reference voltage from one of the first or the second power to be supplied to the first device, a second reference voltage generation unit configured to generate a second reference voltage from the first power to be supplied to the second device, and a switching unit configured to switch to input the second reference voltage to the first device and to input the first reference voltage to the second device or to input the first reference voltage to the first device and not to input any reference voltage to the second device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

First Exemplary Embodiment

Figure 1:
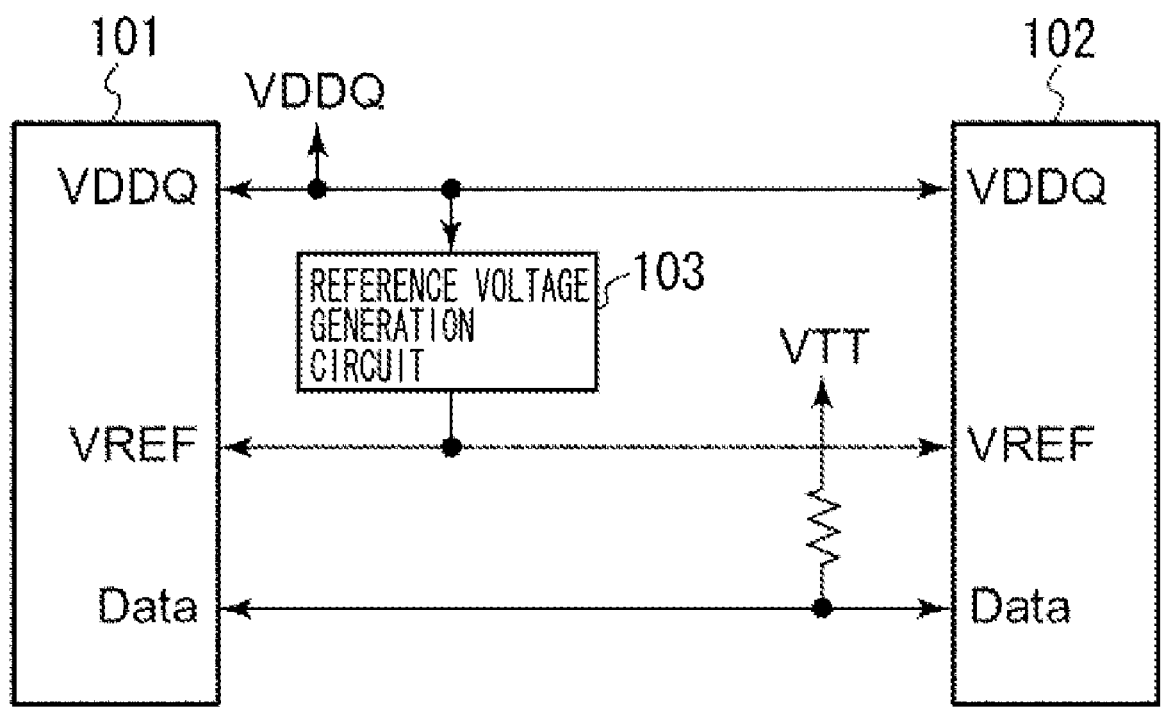
FIG. 1 is a block diagram illustrating a configuration of a conventional SSTL interface circuit.
Figure 2:
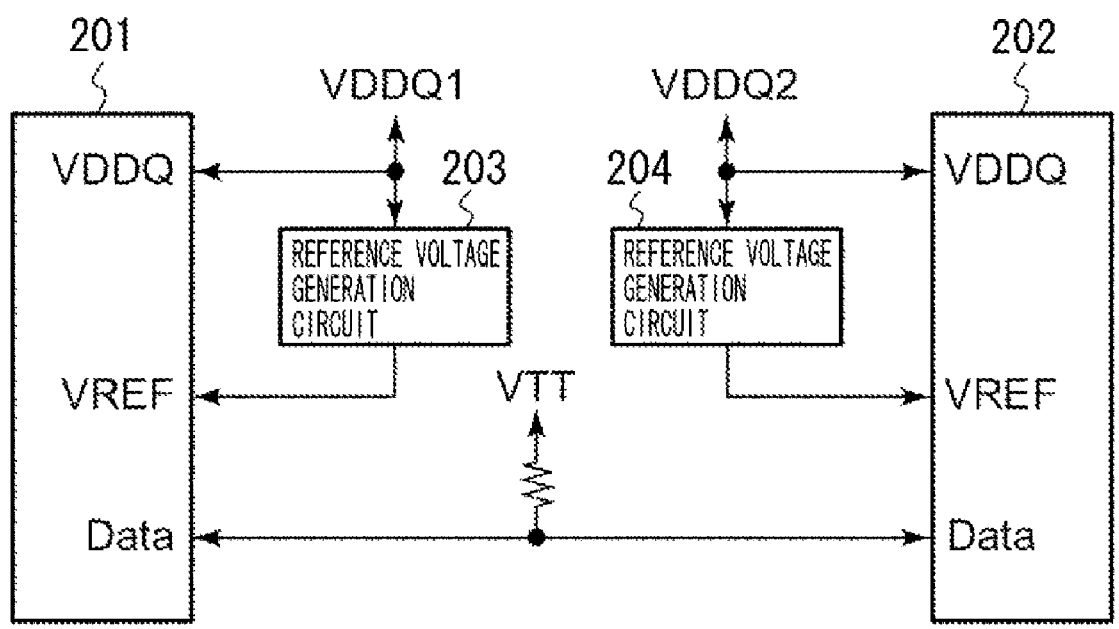
FIG. 2 is a block diagram illustrating a configuration of another conventional SSTL interface circuit.
Figure 3:
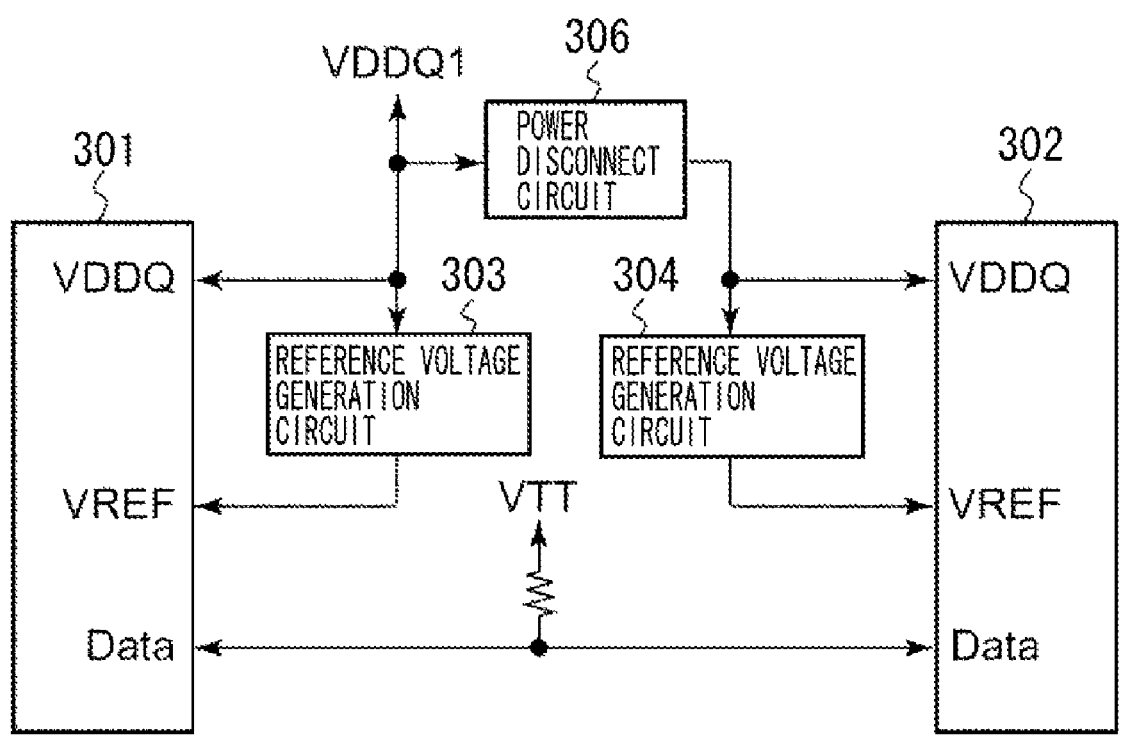
FIG. 3 is a block diagram illustrating a configuration of a further conventional SSTL interface circuit.
Figure 4:
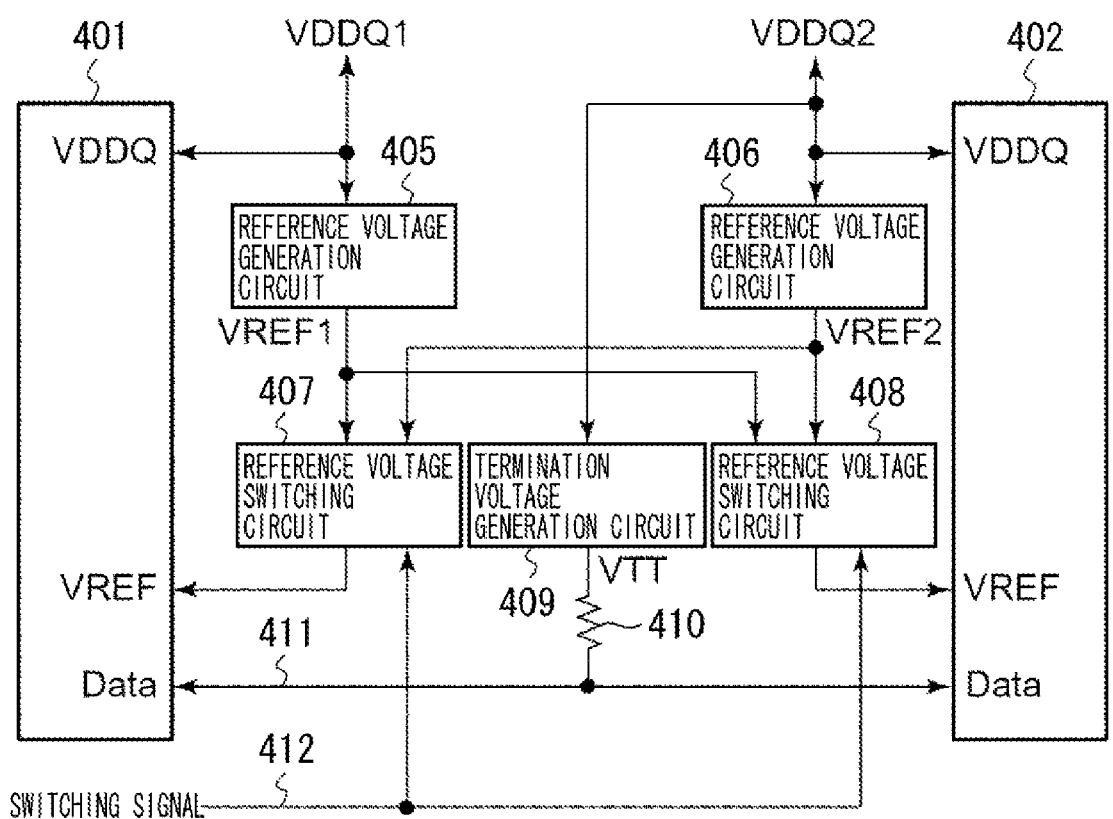
FIG. 4 is a block diagram illustrating an exemplary configuration of an interface circuit according to a first exemplary embodiment of the present invention.

FIG. 4 is a block diagram illustrating an exemplary configuration of an interface circuit according to a first exemplary embodiment of the present invention.

The interface circuit connects a memory 401 and a memory controller 402 via a transmission line 411. The transmission line 411 is connected to a termination voltage VTT via a termination resistor 410. A power VDDQ1 can be supplied to the memory 401. A power VDDQ2 can be supplied to the memory controller 402.

A termination voltage generation circuit 409 is configured to output a voltage obtained by reducing the input voltage to half. In the termination voltage generation circuit 409, the termination voltage VTT is generated from the same power VDDQ2 as that to the memory controller 402.

Reference voltage generation circuits 405 and 406 are configured to output reference voltages VREF1 and VREF2 obtained by reducing the voltages of the powers VDDQ1 and VDDQ2 to half, respectively.

A reference voltage switching circuit 407 selects and inputs, to the memory 401, one of the reference voltages VREF1 and VREF2 output from the reference voltage generation circuits 405 and 406 according to a switching signal 412. A reference voltage switching circuit 408 selects and inputs, to the memory controller 402, one of the reference voltages VREF1 and VREF2 output from the reference voltage generation circuits 405 and 406 according to the switching signal 412.

In a normal operation, that is, when both the power VDDQ1 and the power VDDQ2 are turned on, the reference voltage switching circuits 407 and 408 switch to input the reference voltage VREF2 to the memory 401 and to input the reference voltage VREF1 to the memory controller 402.

When the memory 401 is backed up, that is, when the power VDDQ1 is turned on and the power VDDQ2 is turned off, the reference voltage switching circuits 407 and 408 switch to input the reference voltage VREF1 to the memory 401 and to input the reference voltage VREF2 to the memory controller 402. The switching signal 412 includes a system reset signal for the memory controller 402.

Figure 5:
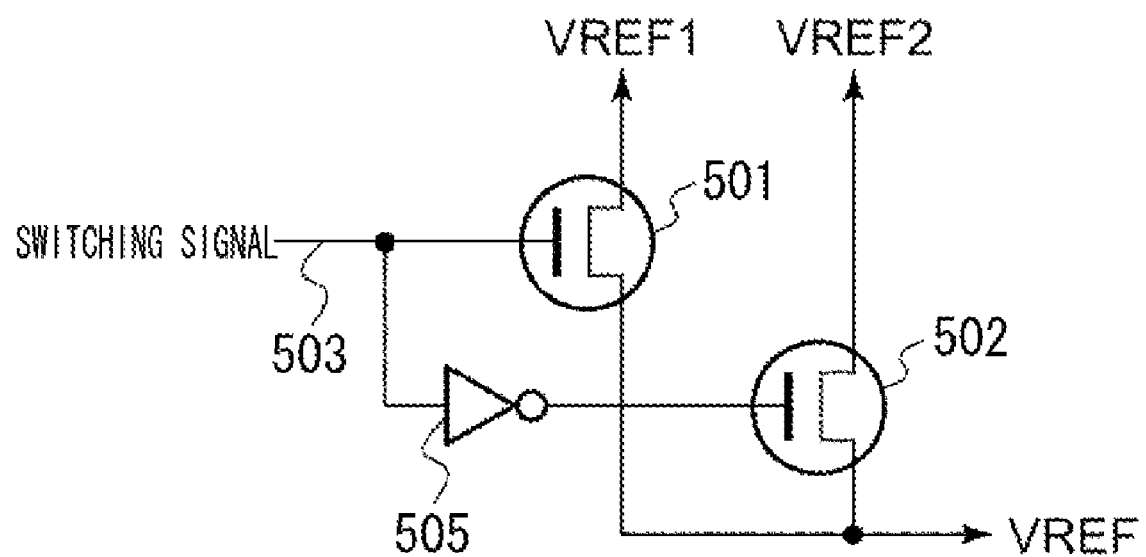
FIG. 5 is a block diagram illustrating an exemplary configuration of a reference voltage switching circuit according to an exemplary embodiment of the present invention.

FIG. 5 is a diagram illustrating a detail configuration of the reference voltage switching circuit 407 or 408.

The reference voltage switching circuit 407 or 408 generates an output voltage VREF by controlling switches 501 and 502, which are connected to input voltages VREF1 and VREF2, respectively. A switching signal 503 is input to the switch 501 and is also input to the switch 502 via an inverter 505. Accordingly, both the switches 501 and 502 are not simultaneously turned on or off. The switch 501 or 502 may include a metal-oxide semiconductor field-effect transistor (MOSFET).

Second Exemplary Embodiment

Figure 6:
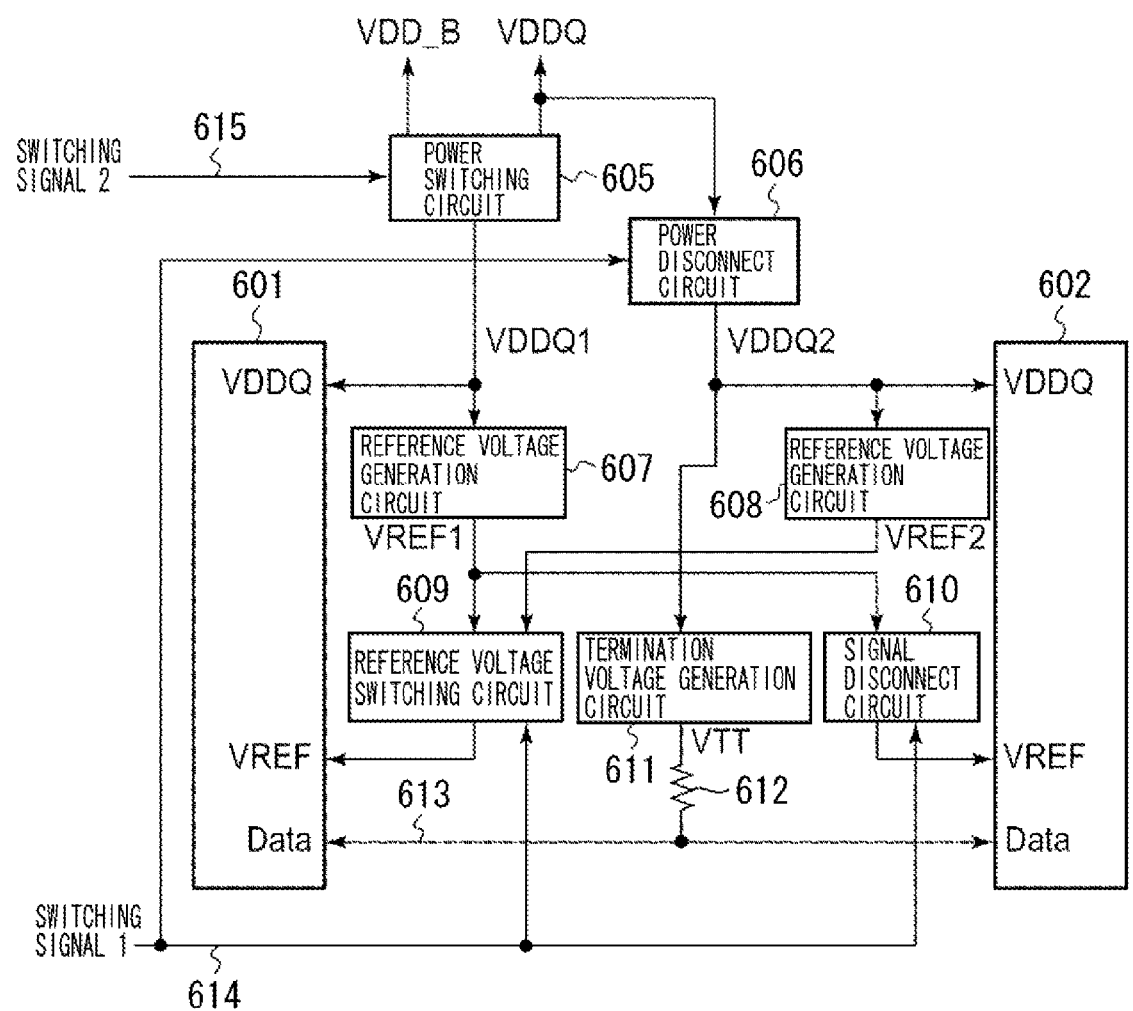
FIG. 6 is a block diagram illustrating an exemplary configuration of an interface circuit according to a second exemplary embodiment of the present invention.

A second exemplary embodiment of the present invention is described below with reference to FIG. 6.

A memory 601 and a memory controller 602 are connected via a transmission line 613. The transmission line 613 is connected to a termination voltage VTT via a termination resistor 612. A power VDDQ1 can be supplied to the memory 601. A power VDDQ2 can be supplied to the memory controller 602.

The power VDDQ1 to be supplied to the memory 601 is generated by switching between a base power VDDQ and a backup power VDD_B. The base power VDDQ is output from a power supply system that is generated from the alternating current (AC) input to a main apparatus. The base power VDDQ can be constantly supplied when the main apparatus is connected to a power supply socket and a main switch is turned on.

The backup power VDD_B is generated from a primary battery or a secondary battery. The backup power VDD_B is used to back up the memory 601 when the main apparatus is not connected to a power supply socket. A power switching circuit 605 switches between the base power VDDQ and the backup power VDD_B according to a switching signal 2 (615). The power switching circuit 605 outputs the backup power VDD_B when the base power VDDQ is turned off and outputs the base power VDDQ when the base power VDDQ is turned on. The switching signal 2 (615) can be generated from a reset signal for the base power VDDQ.

A power disconnect circuit 606 generates the power VDDQ2 by turning the base power VDDQ on or off. The power disconnect circuit 606 includes a MOSFET. A termination voltage generation circuit 611 is configured to output a voltage obtained by reducing the input voltage to half. In the termination voltage generation circuit 611, the termination voltage VTT is generated from the same power VDDQ2 as that to the memory controller 602.

Reference voltage generation circuits 607 and 608 are configured to output reference voltages VREF1 and VREF2 obtained by reducing the voltages of the powers VDDQ1 and VDDQ2 to half, respectively.

A reference voltage switching circuit 609 selects and inputs, to the memory 601, one of the reference voltages VREF1 and VREF2 output from the reference voltage generation circuits 405 and 406 according to a switching signal 1 (614). A signal disconnect circuit 610 generates a reference voltage VREF to be input to the memory controller 602 by turning the reference voltage VREF1 on or off according to the switching signal 1 (614).

In a normal operation, that is, when both the powers VDDQ1 and VDDQ2 are turned on, the reference voltage switching circuit 609 and the signal disconnect circuit 610 operate to input the reference voltage VREF2 to the memory 601 and to input the reference voltage VREF1 to the memory controller 602 according to the switching signal 1 (614).

When the memory 601 is backed up, that is, when the power VDDQ1 is turned on and the power VDDQ2 is turned off, or when the base power VDDQ is turned off, the reference voltage switching circuit 609 and the signal disconnect circuit 610 operate to input the reference voltage VREF1 to the memory 601 and not to input any reference voltage to the memory controller 602 according to the switching signal 1 (614). The switching signal 1 (614) includes a system reset signal for the memory controller 602.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-346261 filed Dec. 22, 2006, which is hereby incorporated by reference herein in its entirety.

What is claimed is:

1. An interface circuit between a memory capable of being supplied with a first power and a memory controller capable of being supplied with a second power independent of the first power, the interface circuit comprising:
   a power switching unit configured to output a backup power as the first power when the memory is backed up, otherwise output a base power as the first power;
   a first reference voltage generation unit configured to generate a first reference voltage from the first power;
   a second reference voltage generation unit configured to generate a second reference voltage from the second power; and
   a reference voltage switching unit configured to switch to input respective different ones of the first and the second reference voltages to the memory and the memory controller.

2. The interface circuit according to claim 1, wherein when the first and the second powers are turned on, the reference voltage switching unit inputs the second reference voltage to the memory and inputs the first reference voltage to the memory controller.

3. The interface circuit according to claim 1, wherein when the first power is turned on and the second power is turned off, the reference voltage switching unit inputs the first reference voltage to the memory and inputs the second reference voltage to the memory controller.

4. An interface circuit between a memory capable of being supplied with one of a base power and a backup power and a memory controller capable of being supplied with only the base power, the interface circuit comprising:
   a power switching unit configured to output the backup power to the memory when the memory is backed up, otherwise output the base power to the memory;
   a first reference voltage generation unit configured to generate a first reference voltage from one of the base power and the backup power to be supplied to the memory;
   a second reference voltage generation unit configured to generate a second reference voltage from the base power to be supplied to the memory controller; and
   a reference voltage switching unit configured to switch to one of (i) input the second reference voltage to the memory and to input the first reference voltage to the memory controller and (ii) input the first reference voltage to the memory and not to input any reference voltage to the memory controller.

5. The interface circuit according to claim 4, wherein when the first and the second powers are turned on, the reference voltage switching unit inputs the second reference voltage to the memory and the first reference voltage to the memory controller.

6. The interface circuit according to claim 4, wherein when the first power is turned on and the second power is turned off, the reference voltage switching unit inputs the first reference voltage to the memory and does not input any reference voltage to the memory controller.

* * * * *